United States Patent [19]
Ito

[11] Patent Number: 4,725,412
[45] Date of Patent: Feb. 16, 1988

[54] OZONE GENERATOR
[75] Inventor: Hajime Ito, Tokyo, Japan
[73] Assignee: Nippon Ozone Co., Ltd., Tokyo, Japan
[21] Appl. No.: 868,328
[22] Filed: May 27, 1986
[30] Foreign Application Priority Data May 30, 1985 [JP] Japan .................. 60-115411

[51] Int. Cl.⁴ ............................ C01B 13/11
[52] U.S. Cl. ..................... 422/186.19; 422/186.18; 422/186.07
[58] Field of Search ............... 422/186.07, 186.18, 422/186.19, 186.2

[56] References Cited
U.S. PATENT DOCUMENTS

| 2,010,081 | 8/1935 | Hartman | 422/186.19 |
| 2,936,279 | 5/1960 | Rindtorff et al. | 422/186.18 X |
| 3,671,417 | 6/1972 | Louboutin | 422/186.18 |
| 4,025,441 | 5/1977 | Tabata et al. | 422/186.19 |

FOREIGN PATENT DOCUMENTS 749939 1/1967 Canada .................. 422/186.18

OTHER PUBLICATIONS

Ozone Generation and Commercial Ozone Generators (brochure), Grace Davison Chemical, W. R. Grace & Co.

Primary Examiner—John F. Terapane
Assistant Examiner—Susan Wolffe
Attorney, Agent, or Firm—Michael J. Striker

[57] ABSTRACT

An ozone generator has a construction in which: an outer and an inner sleeves made of fused quartz or ordinary glass are mounted inside a casing of the generator, which sleeves are substantially concentrically arranged to form an air gap therebetween, while conducting films are formed on the outer periphery of the outer sleeve and the inner periphery of the inner sleeve to provide opposite discharge electrodes an inner one of which is grounded and an outer one of which is connected to high voltage side of an electric source, to which air gap a raw gas is fed while electrical discharge is conducted between these electrodes to produce ozonized gas from the raw gas.

8 Claims, 7 Drawing Figures

OZONE GENERATOR

BACKGROUND OF THE INVENTION

1. Field of the Invention

The present invention relates to an improvement of an ozone generator.

2. Description of the Prior Art

As is well known, ozone is provided with high oxidative activity so that it is employed as an oxidizing agent in a chemical industry since a long time ago. In addition to the above, ozone is widely employed also in sterilization, deodorizing, decoloring and the like uses, and in recent years particularly in fine chemical industry use.

In order to produce a large amount of ozone for industry use, there have been proposed many processes for producing ozone such as a process in which oxygen is irradiated with ultraviolet energy, a process in which the electrolysis of water is conducted and the like process. Among these processes, most widely employed is normally a process in which the silent electrical discharge is conducted between a pair of electrodes which is spaced apart from each other to provide an air gap therebetween, in which process dielectric is attached to at least one of the opposite electrodes and AC voltage is imposed across them to conduct the silent discharge therebetween through the dielectric so that a dry air or oxygen gas passed through the air gap is ozonized to produce ozone.

This process is disadvantageous in that the electrical discharge produces a large amount of heat wwhich increase the temperature of the air of oxygen gas passing through the air gap and in turn the temperature of both the electrodes and the dielectric contacting such air or oxygen gas. On the other hand, ozone is immediately decomposed to oxygen when its temperature increases, so that is is necessary to cool ozone in order to efficiently produce the same. As a result, in practice, a conventional ozone generator is provided with a construction shown in FIGS. 5 and 6, which conventional generator will be hereinbelow described. Such conventional ozone generator employs: a stainless steel cylinder 6 as an electrode; and a glass cylinder 8 concentrically disposed in the stainless steel cylinder 6 and acting as a dielectric, an inner surface of which glass cylinder 8 is provided with a conducting film 10 formed by a suitable process such as a vapor deposition of metal so as to provide the other electrode. Incidentally, in FIG. 5, the reference numeral 5 denotes a metallic casing in which the stainless steel cylinder 6 is mounted through partition boards 7a and 7b hermetically by welding. Inside the stainless steel cylinder 6, there is concentrically mounted through a spacer 9 the glass cylinder 8 which is closed at its one end. An air gap 3 is formed between the glass cylinder 8 and the stainless steel cyliner 6 so that the glass cylinder 8 is normally spaced apart from the stainless steel cylinder 6 by a distance of from 1 to 3 mm. The conducting film 10 is formed on the inner surface of the glass cylinder 8 through a painting process or a vapor deposition process, with which film 10 is brought into contact a brush-like contact element 11 connected with a conductor wire 12 which extends outward through an insulating tube 13 mounted on an end plate 5a of the casing 5 so as to be connected with an electric source unit 14.

On the other hand, outside the stainless steel cyliner 6, a cooling water chamber 15 is defined by the partition boards 7a and 7b, while a chamber 16 for the air or oxygen gas (hereinafter referred to as a raw gas) i.e., a raw gas chamber 16 and a chamber 17 for a mixture gas of ozone and the raw gas, i.e., a mixture gas chamber 17 are formed in an upper and lower portions of the casing 5, respectively. The cooling water chamer 15 is provided with an inlet aperture 15a and outlet aperture 15b, while the raw gas chamber 16 is provided with an inlet aperture 16a and the mixture gas chamber 17 is provided with an outlet aperture 17a, respectively.

Incidentally, as shown in FIG. 7, the spacer 9 is constructed of a stainless steel coil spring shaped into a ring-like configuration so as to not prevent the raw gas and the mixture gas of the same and ozone from freely passing through the air gap 3. The casing 5 is grounded.

When high voltage AC is imposed between the thus constructed casing 5 and the conducting film 10 by the use of the electric source unit 14, the electrical charge is accumulated in the glass cylinder 8 serving as dielectric to a predetermined voltage level at which the breakdown of insulation in the air gap occurs. When the thus accumulated electrical charge reaches such predetermined voltage level, thin columns of electrical discharges occur continuously, which columns vary in number according to the applied voltage and frequency. When the raw gas is fed from the inlet 16a through the raw gas chamber 16 to the air gap 3 subjected to the electrical discharge, a part of oxygen molecules contained in the raw gas is hit with electron to produce activated oxygens through which ozone is then produced.

In this case, generally, only about 10% of the supplied energy of the electrical discharge is used to produce ozone, and the remainder thereof is transformed into heat so that a large amount of heat is produced by such electrical discharge, which heat increases the temperature of the air gap 3. When the temperature of the air gap 3 is increased, the produced ozone is immediatley decomposed into oxygen so that in order to prevent such immediate decomposition of the produced ozone the cooling water is supplied to the cooling water chamber 15 to remove the heat produced by the electrical discharge.

The above description is made as to one set of the ozone generator. Also conventionally employed as a large-capacity ozone generator is one constructed of a plurality of such sets combined in parallel with each other.

The conventional ozone generator having the above construction is effective in the conventional use. However, inr ecent years, the need for high-purity ozone increases in fine chemical use which can not be satisfied with the ordinary-grade ozone such as one produced by the conventional ozone generator, so that the need for improvement of the conventional ozone generator increases. Hereinbelow, the reason for such need will be more specifically described. In the integrated circuit manufacturing plant (hereinafter referred to as the IC plant), in case that ozone is employed as the oxidizing agent, when trace amounts of impurities are contained in the ozonized oxygen, such impurities that is fine particles adhere to the integrated circuit to damage its ultrafine circuit network. Consequently, the IC plant is provided with a so-called clean room to prevent such damage from occurring. In the above-mentioned conventional ozone generator, when electrons hits the surfaces of the stainless steel cylinder 6 and the spacer 9 in the electrical discharge process, fine particles of stainless steel are emitted from such surfaces and are intermingled with the ozonized oxygen, so that such fine particles adhere to the integrated circuit. This is a disadvantage inherent in the conventional ozone generator.

On the other hand, there have been proposed some improvements in which: in place of the stainless steel cylinder, a metallic cylinder lined in its inner surface with suitable dielectric such as glass, ceramics and the like is employed so as to prevent electrons from directly hitting the metal. However, such proposal is disadvantageous in that: since metal and dielectric are different in thermal expansion coefficient from each other, a crack and blister are produced in the dielectric to produce electrical short circuit which produces high current passing through such crack and blister to cause breakage of the dielectric and the metallic electrode; and, in the above-mentioned construction, since the dielectric lining the metal does not adhere to the same to provide a void therebetween, wasteful electrical discharge is conducted in such void so that a part of the supplied electrical power is lost without any contribution to the production of ozone. As a result, the above conventional proposal is poor in commerical use.

In addition to the above, hitherto, further another improvement has been proposed, in which: in place of the stainless steel cylinder, a glass cylinder is employed; and, by using the electrical conductivity of the cooling water received in the cooling water chamber, high voltage AC is imposed between the cooling water and the conducting film provided in the inner surface of the glass cylinder. However, in recent years, in the IC plant, high-purity water being poor in electrical conductivity is generally employed so that the above conventional another improvement is not effective in practical use.

SUMMARY OF THE INVENTION it is an object of the present invention to provide means for resolving the above problems. Namely, it is a first object of the present invention to obtain high-purity ozone containing substantially no contaminant, and it is a second object of the present invention that in producing such high-purity ozone the high-purity water may be employed as cooling water as well as the conventional city water.

It is another object of the present invention to provide an ozone generator having a construction enabling itself to be reduced in size and ensuring a long-term service without any fear of crack and blister in its electrodes and dielectric.

In order to accomplish the above objects of the present invention, the ozone generator of the present invention comprising a casing in which the cooling water may be circulated and an ozone generating section is provided, which section has a construction in which: each of an outer sleeve and an inner sleeve is made of quartz or glass, and has its one end closed and the other end opened, which inner sleeve is concentrically disposed in the outer sleeve so as to form an air gap therebetween; conducting films are provided in an outer peripheral surface of the outer sleeve and an inner peripheral surface of the inner sleeve so as to serve as opposite discharge electrodes spaced apart from each other while such electrode of the outer sleeve is grounded and the other electrode of the inner sleeve is connected to a high voltage terminal of the electric source unit; a raw gas is fed to the air gap formed between these outer and inner sleeves while the cooling water is circulated in a space defined between the outer sleeve and the casing; whereby ozonized is continuously taken out of an outlet aperture provided in a position of an upper portion of the air gap. Namely, in the ozone generator of the present invention, high voltage AC is imposed on the electrode of the inner sleeve by meas of the electric source unit to conduct a silent discharge in the air gap, so that, in case that the raw gas, for example such as pure oxygen is fed to the air gap through the inlet opening, ozone is produced in the air gap and the thus produced ozone is intermigled with oxygen to form a mixture gas which is taken out of the ozone generator of the present invention. In the ozone generator of the present invention, it is possible to employ high-purity water as a cooling water since the electrode, i.e., the conducting film of the outer sleeve is directly grounded, to make it possible to remove the heat generated in the silent electrical discharge so that the electrical discharge is effectively conducted.

DESCRIPTION OF THE PREFERRED EMBODIMENT

Figure 5:
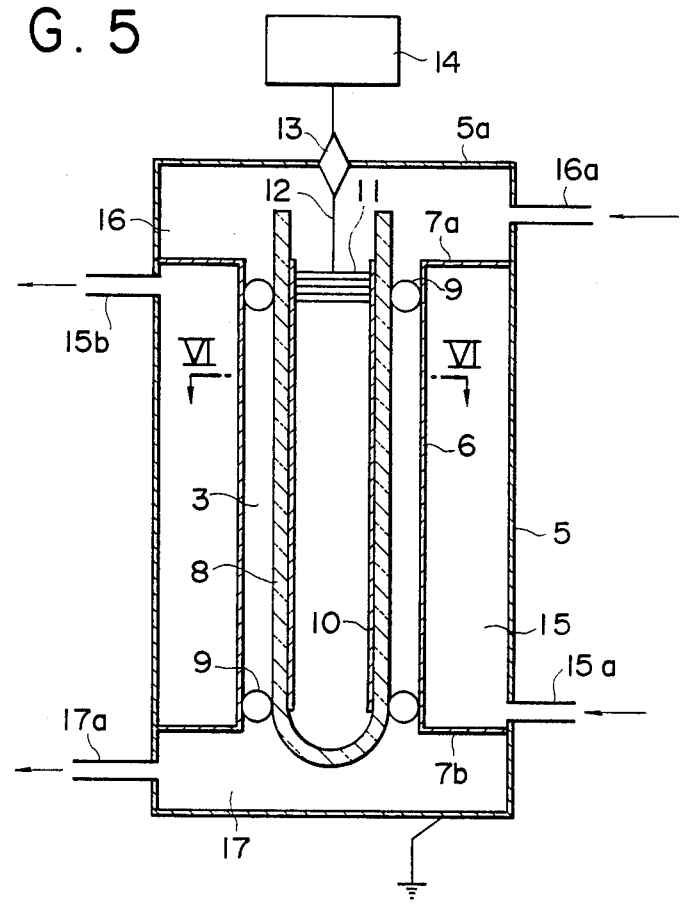
FIG. 5 is a longitudinal sectional view of a conventional ozone generator.
Figure 6:
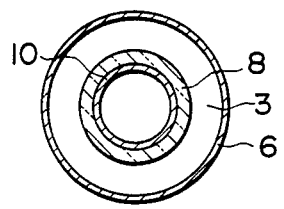
FIG. 6 is a cross sectional view taken along the line VI—VI of FIG. 5.
Figure 7:
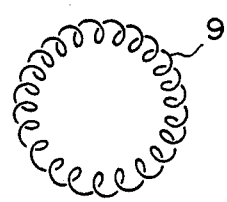
FIG. 7 is a plan view of a spacer employed in the conventional ozone generator.

Hereinbelow, an embodiment of the present invention will be described with reference to the drawings. Incidentally, in the embodiment of the present invention, parts similar in construction to those of the conventional ozone generator are designated by the same reference numerals as those employed in FIGS. 5, 6 and 7, to avoid redundancy in description.

Figure 1:
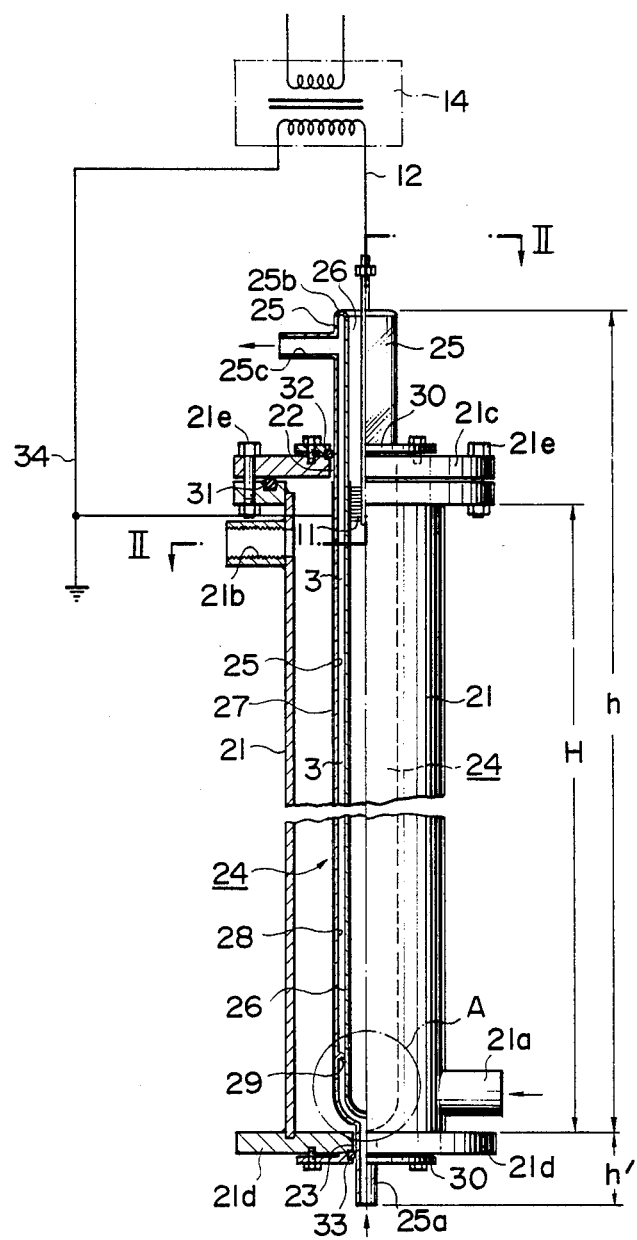
FIG. 1 is a partial longitudinal sectional view of an embodiment of the ozone generator of the present invention.
Figure 2:
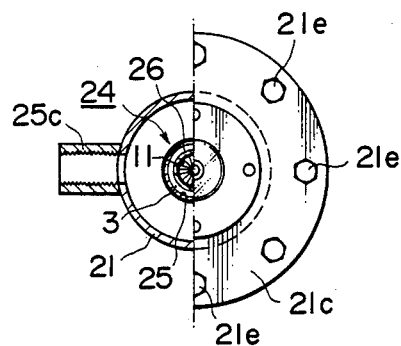
FIG. 2 is a cross sectional view taken along the line II—II of FIG. 1.

In FIGS. 1 and 2, a cylindrical metallic casing 21 has a watertight construction in which an inlet 21a and outlet 21b apertures of cooling water are provided in an upper and lower outer peripheries of the casing 21, respectively, which cooling water is high-purity water.

Mounted on an upper and lower end portions of the casing 21 are end plates 21c and 21d, respectively. These end plates 21c and 21d is provided with openings 22 and 23 in their central portions, respectively. An ozone generating section 24 is disposed in a central portion of the casing 21 in an axial direction of the same, and made of, for example, fused quartz, in which section 24 an outer 25 and inner 26 sleeves having different outer diameters and made of fused quartz are concentrically disposed with each other to form an air gap 3 therebetween, as shown in FIG. 1. Incidentally, it is possible to employ any size as to the ozone generating section. For example, in outer diameter, the outer 25 and inner 26 sleeves may be 22.5 and 17.5 mm, respectively, while both of them may be 1.4–1.5 mm in wall thickness, so that the outer 25 and inner 26 sleeves are spaced from each other by a distance of 1.0–1.2 mm, i.e., an air gap 3 being 1.0–1.2 mm. In such case, the height "h" of the outer sleeve may be 1000 mm while the height "h" of a lower end neck portion 25a may be 30 mm. On the other hand, the casing may be 924 mm in its height "H" and 60.5 mm in its outer diameter.

Incidentally, in this specification, quartz material means both of transparent silica glass (that is fused quartz) and opaque silica glass (that is fused silica). Such quartz material may be employed in the present invention for the outer 25 and inner 26 sleeves which may be also made of ordinary glass typified by sodium silicate glass. However, it is preferable to employ fused quartz in view of its good heat resistance.

A ring-like sealaing member 25b made of the same material as that of the outer 25 and inner 25 sleeves is welded to both top ends of the outer 25 and inner 26 sleeves to seal these top ends, while the lower end neck portion 25a of the outer sleeve 25 remains unsealed to make it possible that the raw gas is fed to the air gap 3 through this neck portion 25a.

Figure 3:
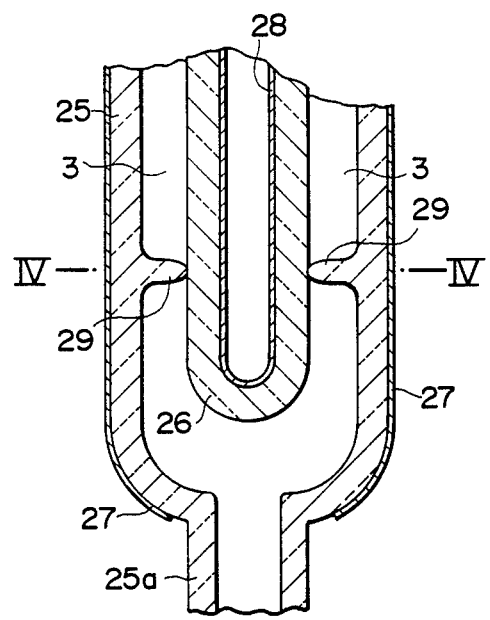
FIG. 3 is an enlarged view of portion "A" of FIG. 1.
Figure 4:
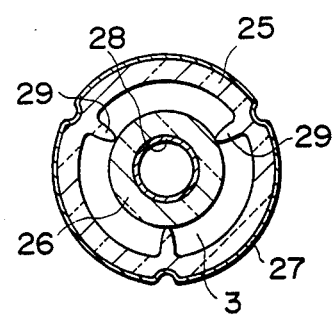
FIG. 4 is a cross sectional view taken along the line IV—IV of FIG. 3.

As shown in the enlarged views in FIGS. 3 and 4, in an assembling in which the inner sleeve 26 is concentrically disposed in the outer sleeve 25, the inner sleeve 26 maintains its correct position by means of a spacer 29 integrally formed inside the lower portion of the outer sleeve 25, so as to form the air gap 3. Ont he other hand, an outer periphery of the outer sleeve 25 and an inner periphery of the inner sleeve 26 are coated with metallic (for example such as aluminum) vapor deposition films which constitute water-resisting conducting films 27 and 28 serving as discharge electrodes, respectively. Such electrodes may be produced by any suitable processes, for example such as the above-mentioned metallic vapor deposition, painting of colloidal graphite concentrate containing water as its dispersion phase, metal spraying and the painting of the following electrically conductive resin in which: powder of silver, nickel and the like is employed as filler; and epoxy resin or acrylic acid resin is employed as binder; whereby such filler and binder are mixed by equivalent amount to each other to produce the resin which is applied to predetermined portions of the outer 25 and inner 26 sleeves to form such conducting films, provided that the thus formed conducting films have good water-resisting properties.

As already described in the above, the lower and neck portion 25a of the outer sleeve 25 constitutes the inlet aperture for the raw gas to be passed through the air gap 3, while an upper portion of the air gap 3 defined by the outer 25 and inner 26 sleeves is sealed with the ring-like sealing member 25b made of fused quartz and an outlet aperture 25c for the produced ozonized gas is provided in the upper portion of the outer sleeve 25. As described above, the inner sleeve 26 is concentrically disposed in the outer sleeve 25 and both the top ends of these inner 26 and outer 25 sleeves are welded to the sealing member 25b, to make it possible to position the inner 26 and outer 25 sleeves at their upper portions through such sealing member 25b. On the other hand, in the lower portions of these sleeves 25 adn 26, they are positioned through the spacer 29 projecting from the inner periphery of the outer sleeve 25 as shown in FIGS. 3 and 4 and abutting against the outer periphery of the inner sleeve 26 so as to correctly define the air gap 3 in size.

Incidentally, this supporting spacer 29 may be integrally formed with both of the outer 25 and inner 26 sleeves. Further, it is also possible to separately provide the spacer 29 made of fused quartz so that the spacer 29 is bonded to both of the outer 25 and inner 26 sleeves. Thus, as shown in FIG. 3, the spacer 9 keeps the air gap 3 uniform by equally spacing apart the inner sleeve 26 from the outer sleeve 28.

The ozone generating section 24 having the above construction is substantially concentrically mounted inside the casing 21 in a manner that: the upper portion of the ozone generating section 24 extends upward from the opening 22 provided in the end plate 21c of the casing 21; the inlet pipe 25a of the raw gas provided in the lower end of the ozone generating section 24 extends downward from the opening 23 of the lower end plate 21d of the casing 21, which lower end plate 21d is previously hermetically assembled with the casing 21; the ozone generating section 24 is inserted into the casing 21 from the upper portion of the same and mounted therein; the upper end plate 21c is mounted on the upper end of the casing 21 and and fastened thereto by means of bolts 21e through a packing 31; and set-plate 30 are mounted on both the opening portion 22 of the upper end plate 21c and the opening portion 23 of the lower end plate 21d through packings 32 and 33, respectively, and fastened thereto to make the interior of the casing 21 watertight.

Incidentally, in the ozone generatign section 24, the contact element 11 is so mounted that it contact the conducting film 28 provided on the inner periphery of the inner sleeve 26, which contact element 11 is connected to the high voltage side (that is ungrounded side) of the electric source unit 14 through a conductor wire 12, while the other conducting film 27 serving as an electrode provided on the outer periphery of the outer sleeve 25 is grounded through a conductor wire 34 as shown in FIG. 1.

In the above embodiment of the present invention, though both the outer 25 and inner 26 sleeves are constructed of cylinders made of fused quartz, it is also possible that such sleeves 25, 26 are made of ordinary glass, and that the sleeves 25, 26 are shaped into cylindrical shapes having square cross sections or elliptical cross secitons. Further, it is possible that the spacer 29 is made of the ordinary glass in place of fused quartz.

Since the ozone generator of the present invention has the above construction, there is no metallic member and organic substance in the electrical discharge portion serving as the ozone generating section of the generator of the present invention, so that there is no fear that fine particles of metal and other substances are emitted through hits of electrons in the electrical discharge portion. Consequently, there is no fear of damaging the products which are produced through processes employing the ozonized gas. Further, the ozone generator of the present invention is advantageous in that it is possible to employ high-purity water as the cooling water as well as ordinary water such as city water and well water, in its efficient production of ozonized gas.

What is claimed is:

1. An ozone generator comprising:
   a casing with an inner surface;
   an elongated outer sleeve having an outer periphery;
   an elongated inner sleeve having an inner periphery, said outer sleeve and said inner sleeve being arranged in said casing substantially concentric to each other longitudinally so as to define an air gap therebetween;
   an electric source with a high voltage side;

an inner electrode composed of a conducting film and provided on said inner periphery of said inner sleeve and connected to said high voltage side of said electric source;

an outer electrode grounded and composed of a conductng film that is water-resistant and provided on said outer periphery of said outer sleeve, said inner electrode and said outer electrode being formed to produce an electrical discharge that generates heat and produces ozonized oxygen from oxygen gas when the oxygen gas is in said air gap, said inner sleeve and said outer sleeve each having means for preventing impurities from entering the ozonized oxygen during said electrical discharge and including a dielectric material composing both said inner sleeve and said outer sleeve;

means for keeping said air gap uniform between said inner sleeve and said outer sleeve so that said inner sleeve and said outer sleeve are equally spaced apart from each other and including a spacing member extending between said inner sleeve and said outer sleeve so as to separate said inner sleeve and said outer sleeve by a predetermined distance, said spacing member also being formed of a dielectric material so as to thereby have means for additionally preventing impurities from entering the ozonized oxygen during the electrical discharge; and means for preventing formation of a crack and a blister in said dielectric material of said outer sleeve from said heat produced by the electrical discharge between said inner electrode and said outer electrode and including a passage formed between said inner surface of said casing and said outer electrode on said outer periphery of said outer sleeve, said dielectric material of said outer sleeve and said conducting film of said outer electrode having different thermal expansion coefficients so that the crack and blister forms in said dielectric material of said outer sleeve froms said heat if said heat is not removed, said passage being formed to accomodate circulating cooling water therethrough to thereby remove said heat produced by said electrical discharge.

2. The ozone generator as defined in claim 1, wherein said air gap constitutes a raw gas passsage with two ends; further comprising:
an inlet aperture for raw gas provided at one of said two ends of said raw gas passage; and
an outlet aperture for ozonized gas provided at the other of said two ends of said raw gas passage.

3. The ozone generator as defined in claim 1, wherein said spacing member is integrally formed with one of said inner sleeve and said outer sleeve, said spacing member being arranged to space said inner sleeve and said outer sleeve apart by a predetermined distance.

4. The ozone generator as defined in claim 3, wherein said keeping means also includes a ring-like sealing member to which are connected said inner sleeve and said outer sleeve, said sealing member spacing said inner sleeve and said outer sleeve apart by said predetermined distance, said sealing member being formed of a dielectric material to thereby also prevent impurities from entering the ozonized oxygen from said sealing member.

5. The ozone genertor as defined in claim 1, wherein said dielectric material of said inner sleeve and said outer sleeve is selected from the group consisting of quartz material and glass material.

6. The ozone generator as defined in claim 1, wherein said dielectric material of each of said inner sleeve and said outer sleeve is composed of fused quartz, each of said inner electrode and said outer electrode being composed of metallic vapor of aluminum deposited on said inner periphery of said inner sleeve and said outer periphery of said outer sleeve respectively.

7. The ozone generator as defined in claim 1, wherein said conducting film of each of said inner electrode and said outer electrode is composed of colloidal graphite concentrate containing a dispersion phase of water that is painted on said inner periphery of said inner sleeve and said outer periphery of said outer sleeve respectively.

8. The ozone generator as defined in claim 1, wherein said conducting film of each of said inner electrode and said outer electrode is composed of a conducting resin with a filler of metal powder.

* * * * *